(12) United States Patent
Gonzalez

(10) Patent No.: US 10,869,090 B2
(45) Date of Patent: *Dec. 15, 2020

(54) SYSTEMS AND METHODS FOR NOTIFYING A USER WHEN ACTIVITY EXCEEDS AN AUTHORIZATION LEVEL

(71) Applicant: Rovi Guides, Inc., San Jose, CA (US)

(72) Inventor: Danielle Gonzalez, Santa Clara, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/017,172

(22) Filed: Jun. 25, 2018

(65) Prior Publication Data

US 2018/0376203 A1 Dec. 27, 2018

Related U.S. Application Data

(63) Continuation of application No. 15/384,455, filed on Dec. 20, 2016, now Pat. No. 10,009,653, which is a continuation of application No. 14/187,565, filed on Feb. 24, 2014, now Pat. No. 9,560,413.

(51) Int. Cl.
| | |
|---|---|
| *H04N 21/454* | (2011.01) |
| *H04N 21/475* | (2011.01) |
| *H04N 21/4545* | (2011.01) |
| *H04N 21/442* | (2011.01) |
| *H04N 21/45* | (2011.01) |

(52) U.S. Cl.
CPC ... *H04N 21/4542* (2013.01); *H04N 21/44222* (2013.01); *H04N 21/4532* (2013.01); *H04N 21/45457* (2013.01); *H04N 21/4751* (2013.01); *H04N 21/4756* (2013.01)

(58) Field of Classification Search
CPC ......... H04N 21/44222; H04N 21/4542; H04N 21/4532; H04N 21/4751; H04N 21/45457; H04N 21/4756
See application file for complete search history.

(56) References Cited

U.S. PATENT DOCUMENTS

| | | | | |
|---|---|---|---|---|
| 5,465,113 A | * | 11/1995 | Gilboy | H04N 7/10 348/E7.049 |
| 5,922,040 A | * | 7/1999 | Prabhakaran | G08G 1/127 340/990 |
| 6,038,451 A | * | 3/2000 | Syed | H04M 3/54 455/417 |
| 6,243,039 B1 | * | 6/2001 | Elliot | G01S 19/16 342/357.74 |

(Continued)

*Primary Examiner* — Justin R. Blaufeld
(74) *Attorney, Agent, or Firm* — Haley Guiliano LLP

(57) ABSTRACT

Systems and methods for generating a notification when activity exceeds an authorization level are provided. A determination is made as to whether content currently being presented to a first user exceeds an authorization level associated with the first user. In response to determining that the content exceeds the authorization level, the content being presented is monitored to determine whether the content meets a criterion. An amount of time the content being presented meets the criterion is measured. In response to determining that the amount of time exceeds a threshold, a communication is transmitted to a second user indicating that the content currently being presented to the first user exceeds the authorization level.

20 Claims, 5 Drawing Sheets

(56) References Cited

U.S. PATENT DOCUMENTS

| | | | |
|---|---|---|---|
| 6,778,837 B2* | 8/2004 | Bade | H04W 12/08 342/457 |
| 6,985,588 B1* | 1/2006 | Glick | G06F 21/10 380/258 |
| 7,272,295 B1* | 9/2007 | Christopher | G11B 27/034 386/241 |
| 7,792,297 B1* | 9/2010 | Piccionelli | H04L 63/107 380/258 |
| 9,277,472 B1* | 3/2016 | Price | H04W 72/06 |
| 2002/0078441 A1* | 6/2002 | Drake | H04N 7/17318 725/9 |
| 2002/0137524 A1* | 9/2002 | Bade | H04W 12/08 455/456.2 |
| 2002/0184620 A1* | 12/2002 | Davies | H04L 12/2827 725/25 |
| 2002/0184652 A1* | 12/2002 | Cezeaux | H04N 5/44543 725/132 |
| 2003/0037110 A1* | 2/2003 | Yamamoto | H04L 51/20 709/204 |
| 2003/0105822 A1* | 6/2003 | Gusler | H04L 51/04 709/206 |
| 2003/0151501 A1* | 8/2003 | Teckchandani | B60R 25/33 340/426.19 |
| 2003/0167308 A1* | 9/2003 | Schran | H04L 63/20 709/205 |
| 2003/0188191 A1* | 10/2003 | Aaron | H04L 63/1441 726/23 |
| 2003/0188199 A1* | 10/2003 | Tadano | G06F 21/35 726/35 |
| 2004/0003071 A1* | 1/2004 | Mathew | H04L 63/083 709/223 |
| 2004/0003393 A1* | 1/2004 | Gutta | H04N 21/4223 725/25 |
| 2004/0006621 A1* | 1/2004 | Bellinson | G06F 16/9535 709/225 |
| 2004/0010798 A1* | 1/2004 | Galli | H04N 7/163 725/28 |
| 2004/0111479 A1* | 6/2004 | Borden | H04L 12/1813 709/206 |
| 2004/0153518 A1* | 8/2004 | Seligmann | H04W 48/20 709/206 |
| 2004/0158630 A1* | 8/2004 | Chang | H04L 41/24 709/224 |
| 2004/0158631 A1* | 8/2004 | Chang | H04L 41/24 709/224 |
| 2004/0186989 A1* | 9/2004 | Clapper | G06F 21/85 713/151 |
| 2004/0205194 A1* | 10/2004 | Sahai | G06F 21/50 709/228 |
| 2004/0249938 A1* | 12/2004 | Bunch | H04L 43/00 709/224 |
| 2004/0254698 A1* | 12/2004 | Hubbard | G08G 1/0104 701/32.7 |
| 2004/0260801 A1* | 12/2004 | Li | H04L 63/0227 709/223 |
| 2005/0012612 A1* | 1/2005 | Przygoda, Jr. | G06K 17/00 340/539.13 |
| 2005/0015795 A1* | 1/2005 | Iggulden | H04N 21/4622 725/20 |
| 2005/0044404 A1* | 2/2005 | Bhansali | G06F 21/88 726/26 |
| 2005/0060738 A1* | 3/2005 | Stecyk | H04N 7/10 725/10 |
| 2005/0073443 A1* | 4/2005 | Sheha | G01C 21/3697 340/995.1 |
| 2005/0130633 A1* | 6/2005 | Hill | H04M 15/723 455/414.1 |
| 2005/0187020 A1* | 8/2005 | Amaitis | G07F 17/32 463/42 |
| 2005/0240959 A1* | 10/2005 | Kuhn | H04N 21/4532 725/25 |
| 2005/0240967 A1* | 10/2005 | Anderson | H04N 21/812 725/52 |
| 2006/0057550 A1* | 3/2006 | Sahashi | G09B 7/00 434/350 |
| 2006/0221173 A1* | 10/2006 | Duncan | H04N 21/6581 348/14.02 |
| 2007/0136772 A1* | 6/2007 | Weaver | H04N 21/6377 725/95 |
| 2007/0242926 A1* | 10/2007 | Huang | H04N 21/458 386/239 |
| 2009/0213001 A1* | 8/2009 | Appelman | G06F 17/30 342/357.59 |
| 2010/0274479 A1* | 10/2010 | Sheha | G01C 21/26 340/995.13 |
| 2011/0258664 A1* | 10/2011 | Kuo | H04N 21/44204 725/46 |
| 2013/0055136 A1* | 2/2013 | Aaron | H04M 15/8016 715/772 |
| 2013/0073968 A1* | 3/2013 | Appelman | H04L 67/306 715/736 |
| 2013/0211879 A1* | 8/2013 | Holland | G06Q 30/0241 705/7.32 |
| 2013/0211925 A1* | 8/2013 | Holland | G06Q 30/0241 705/14.72 |
| 2013/0295876 A1* | 11/2013 | Sargin | H04L 12/1453 455/405 |
| 2013/0326611 A1* | 12/2013 | Gargi | G06F 21/31 726/16 |
| 2016/0036931 A1* | 2/2016 | Mathis | H04L 67/22 709/224 |

\* cited by examiner

SYSTEMS AND METHODS FOR NOTIFYING A USER WHEN ACTIVITY EXCEEDS AN AUTHORIZATION LEVEL

CROSS-REFERENCE TO RELATED APPLICATIONS

This application is a continuation of U.S. patent application Ser. No. 15/384,455, filed Dec. 20, 2016 (currently pending), which is a continuation of U.S. patent application Ser. No. 14/187,565, filed Feb. 24, 2014, (now U.S. Pat. No. 9,560,413), the disclosure of which are hereby incorporated by reference herein in their entireties.

BACKGROUND

Traditional systems enable a parent user at a remote location to monitor what content a child user is viewing in the home. These systems may even notify the parent user when the child user accesses content on which the parent user has placed restrictions. However, these traditional systems do not account for other factors surrounding the unpermitted content access before informing the parent user. As such, these systems tend to generate too many false positives and overburden the parent user with inadvertent notifications.

SUMMARY

In view of the foregoing, systems and methods for notifying a user when activity exceeds an authorization level are provided. Specifically, the systems and methods transmit a communication to a second user when a first user is performing activity for a given period of time that exceeds an authorization level of the first user.

In some embodiments, a request from a first user to access content is received. A determination is made as to whether the requested content that is currently being presented to a first user exceeds an authorization level associated with the first user. In some embodiments, the authorization level corresponds to a content rating.

In some embodiments, in response to determining that the content exceeds the authorization level, the content being presented is monitored to determine whether the content meets a criterion. An amount of time the content being presented meets the criterion is measured. In response to determining that the amount of time exceeds a threshold, a communication is transmitted to a second user indicating that the content currently being presented to the first user exceeds the authorization level. In some implementations, the second user may be at a location remote from the first user and the first user may be operating one user equipment device while the second user may be operating a different user equipment device (e.g., a second screen device). The communication may be presented to the second user and may include an identifier of the content, description of the content, identifier of the user and options relating to controlling the user equipment used by the first user to access the content. The communication may enable the second user to prevent further access by the first user to the content currently being presented to the first user. The communication may enable the second user to establish a voice or video call with the first user.

In some embodiments, the content includes a program segment and an advertising segment. The content may be monitored to determine whether the content currently being presented corresponds to the program segment or the advertising segment. The content being presented is determined to meet the criterion when the content currently being presented corresponds to the program segment. In such circumstances, the measurement of time during which the content is presented represents how long the first user was accessing a program segment only and discounts the portions of the time the first user was accessing an advertising segment.

In some embodiments, a timer is run while the content being presented meets the criterion. When the content being presented fails to meet the criterion, the timer is paused. The timer may be resumed when the content being presented meets the criterion following the content failing to meet the criterion.

In some embodiments, a progression point in the content past a starting point of the content is determined. A type of the content that is being presented at the progression point is identified. The criterion used to condition measuring time, during which the content is being presented, is retrieved based on the type of the content. In some implementations, the threshold is retrieved based on the type of the content being presented at the progression point. In some implementations, the criterion is determined based on a user profile.

In some embodiments, the amount of time may be measured at a faster rate when the content currently being presented is of a first type. In some embodiments, the amount of time may be measured at a slower rate when the content currently being presented is of a second type. For example, the timer may run faster (e.g., to reach the threshold at a faster rate) when the content being presented includes nudity but may run slower (e.g., to reach the threshold at a slower rate) when the content being presented does not include nudity or includes an animation. In some embodiments, the threshold may be adjusted based on at least one of a number of other users within proximity of the first user and an attribute of another user within the proximity of the first user.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION

Figure 1:
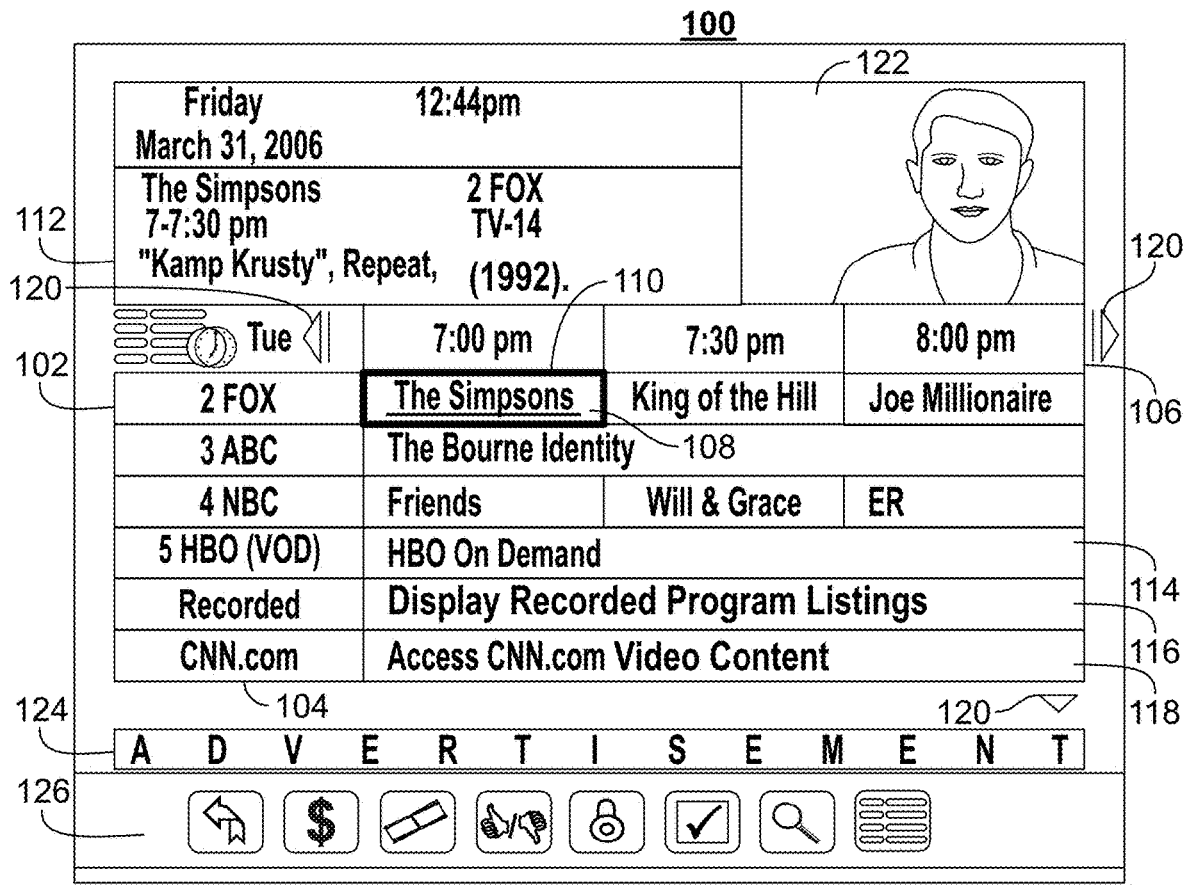
FIGS. 1 and 2 show illustrative display screens that may be used to provide media guidance application listings in accordance with an embodiment of the invention.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content.

As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, webcasts, etc.), video clips, audio, content information, pictures, rotating images, documents, playlists, websites, articles, books, electronic books, blogs, advertisements, chat sessions, social media, chat rooms, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

As referred to herein, the phrase "authorization level" means a measure of content classification identifying the type and strength of mature content or a measure of type of access permitted on a user equipment device. Higher authorization levels allow access to content having more mature content than lower authorization levels. Higher authorization levels allow access to more resources (e.g., on-demand content, pay-per-view content and longer periods of use) than lower authorization levels. Namely, a lower authorization level restricts access to content having less mature content than a higher authorization level. Higher authorization levels may allow access to a greater selection of content than a lower authorization level. Specifically, an authorization level of R may allow access to R-rated content and PG-13 and below while an authorization level of PG-13 may allow access to PG-13 content and below but not R-rated content because an R-rating may be associated with a higher level than PG-13. In some implementations, the authorization level may correspond to the television rating system (e.g., 'A' for adult themes and/or dangerous stunts-USED IN: PG, M, MA, AV/MAV, R and X. Strengths Are: "Adult Themes" (PG) & "Strong Adult Themes" (M, MA, AV, R & X); 'V' for violence-USED IN: PG, M, MA, AV/MAV, and R. Strengths Are: "Mild Violence" (PG), "Some Violence" (PG, M, MA), "Frequent Violence" (M, AV), "Strong Violence" (M, AV) & "Frequent Strong Violence" (AV.); 'L' for coarse language-USED IN: PG, M, MA, AV/MAV, R and X. Strengths Are: "Mild Coarse Language" (PG), "Some Coarse Language" (PG, M, MA, AV, R & X), "Frequent Coarse Language" (M, MA, AV, R & X), "Very Coarse Language" (M, MA, AV, R & X) & "Frequent Very Coarse Language" (MA, AV, R & X); 'S' for sexual references and/or sex scenes-USED IN: PG, M, MA, AV/MAV R and X. Strengths Are: "Sexual References" (PG, M, MA, AV, R & X), "Strong Sexual References" (M, MA, AV, R & X), "A Sex Scene" (M, MA, AV, R & X), "Sex Scenes" (M, MA, AV, R & X), "A Strong Sex Scene" (M, MA, AV, R & X) & "Strong Sex Scenes" (M, MA, AV, R & X.); 'H' for horror or supernatural themes—USED IN: M, MA, AV/MAV and R. Strengths Are: "Horror" (M, MA, AV & R), "Supernatural Themes" (PG, M, MA, AV & R), "Strong Horror" (M, MA, AV & R) & "Strong Supernatural Themes" (M, MA, AV & R.); and 'D' for drug references and/or drug use—USED IN: PG, M, MA, AV/MAV, R and X. Strengths Are: "Drug References" (PG, M, MA, AV, R & X), "Drug Use" (M, MA, AV, R & X), "Strong Drug References" (M, MA, AV, R & X) & "Strong Drug Use" (M, MA, AV, R & X.). In some implementations, the authorization level may correspond to the movie content rating system (G, PG, R, PG-13, X, NC-17).

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a website), or as stand-alone applications or clients on user equipment devices. Various devices and platforms that may implement media guidance applications are described in more detail below.

One of the functions of the media guidance application is to provide media guidance data to users. As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), messages from a crowd of users on a social network, messages from a crowd of users posted to a blog or website, genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections. In some implementations, this data may be referred to as a data feed. As referred to herein, the term "crowd" should be understood to mean any number of users greater than one.

Figure 2:
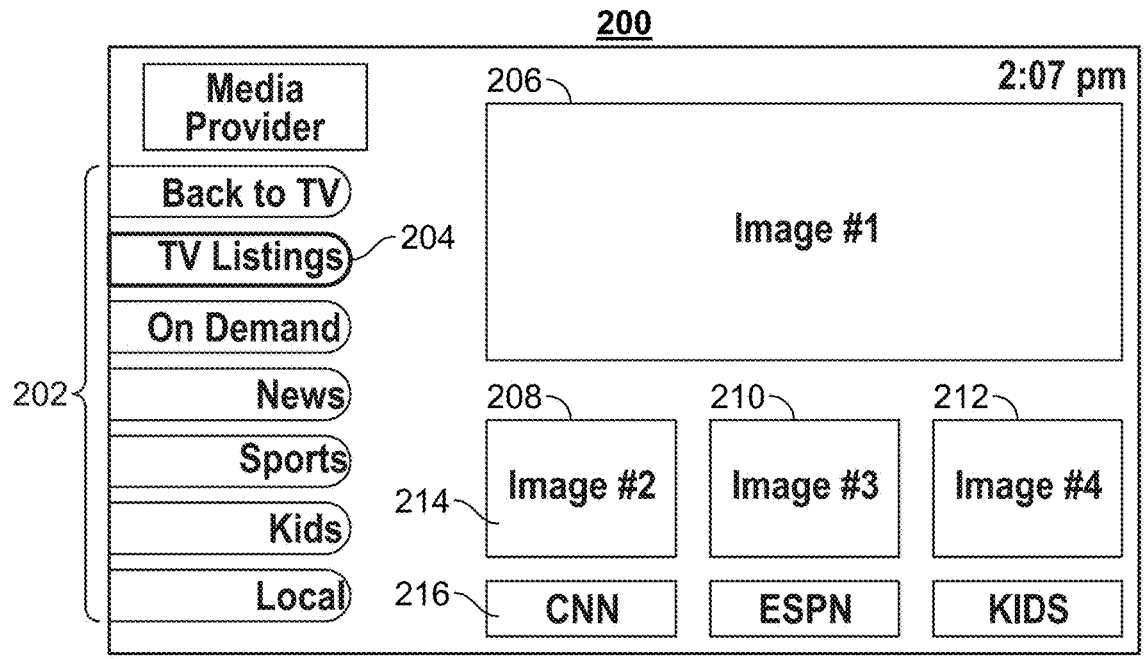

FIGS. 1-2 show illustrative display screens that may be used to provide media guidance data. The display screens shown in FIGS. 1-2, 5 and 6 may be implemented on any suitable user equipment device or platform. While the displays of FIGS. 1-2, 5 and 6 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information.

As referred to herein, the phrase "in response" should be understood to mean automatically, directly and immediately as a result of, without further input from the user, or automatically based on the corresponding action where intervening inputs or actions may occur.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to, or as alternative to, providing access to linear programming (e.g., content that is scheduled to be transmitted to a plurality of user equipment devices at a predetermined time and is provided according to a schedule), from content sources (e.g., television channels or scheduled streaming sources) the media guidance application may also provide access to non-linear programming (e.g., content accessible to a user equipment device at any time and not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet website or other Internet access (e.g., FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different from display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other airtimes or ways of receiving a program, recording a program, enabling series recording of a program, setting program and/or channel as a favorite, purchasing a program, or other features. Options available from a main menu display may include search options, VOD options (e.g., fast-access playback operations), parental control options, Internet options, cloud-based options, device synchronization options, options to set up a timer for transmitting a notification to a user about activity that exceeds an authorization level, options to set up an authorization level for one or more users, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other websites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. The user profile information may include identifiers of one or more social networks or blogs the user is associated with. For each social network or blog a username and password (e.g., log-in information) may be stored in the user profile information. Control circuitry 304 may utilize this information in the user profile to automatically access the social network or blog to post or transmit information/content/segments to or retrieve information/contents/segments from the social network or blog. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200, the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
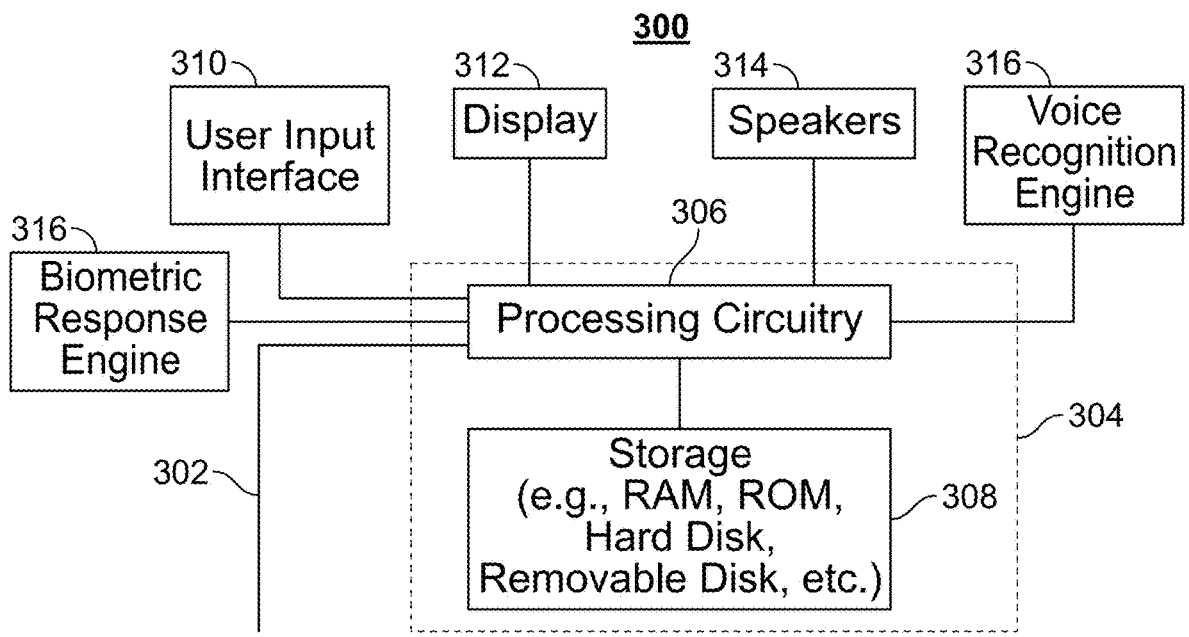
FIG. 3 shows an illustrative user equipment device in accordance with another embodiment of the invention.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

In some embodiments, a viewing history may be stored in storage 308 for a user. The viewing history may include indications of which media assets have been viewed by a given user. The viewing history may also include, for each media asset, which portion or portions have or have not been viewed by the user. In some implementations, the viewing history may include indications of which users in a group of users have seen or viewed a media asset or a particular segment of a media asset. The group of users may be users in a certain geographical location (e.g., in the same home) or users that are associated with each other on a social network.

In some embodiments, authorization levels for one or more users, criteria against which content is compared to condition measurement of how long the content is presented, and threshold against which the time measurement is compared for triggering the transmission of a notification about activity that exceeds an authorization level may be stored in storage 308. Control circuitry 304 may retrieve from storage 308 an authorization level for a first user. Control circuitry 304 may monitor the content being presented to determine whether the content exceeds the authorization level associated with the first user (e.g., a child user). In response to determining that the content exceeds the authorization level, control circuitry 304 may retrieve a criterion from storage 308 and monitor the content being presented to determine whether the criterion is met. Control circuitry 304 may retrieve a threshold from storage 308 and measure the length of time the content being presented meets the criterion.

Upon determining that the length of time exceeds the retrieved threshold, control circuitry 304 may instruct communications circuitry to transmit a communication to a second user indicating that activity performed by the first user exceeds an authorization level. In some embodiments, the communication may be sent to the second user as an e-mail, SMS message, MMS message, text message, audio or phone call, video or video call.

In some embodiments, the communication may include information associated with the content that was accessed that exceeds the authorization level. For example, the communication may include the title of the content, the identity of the first user, description of the content, rating of the content, attribute of the content, and/or any other information listed in region 620 (FIG. 6) that is associated with the content.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In some embodiments, control circuitry 304 may include voice or verbal input processing circuitry, such as a voice recognition engine 316. This voice or verbal input processing circuitry may include any interface that performs a voice recognition process. Control circuitry 304 may continuously or periodically access the microphone of user input interface 310 to detect the presence of voice input. Upon detecting voice input, control circuitry 304 may utilize voice recognition engine 316 (implemented in software or with dedicated circuitry) to identify who the user is who provided the verbal input. Based on this identification, control circuitry 304 may retrieve from storage 308 the corresponding authorization level of the user.

In some embodiments, control circuitry 304 may include a biometric response engine 318. Biometric response engine 318 may include circuitry that remotely or directly monitors a user's physiological and physical responses to content being presented. For example, biometric response engine 318 may include a heart pulse rate monitor, facial expression or position detection circuitry, eye movement and position detection circuitry, breathing pattern detection circuitry, user position and orientation detection circuitry, and/or any combination thereof. Control circuitry 304 may continuously or periodically access biometric response engine 318 to detect any changes (or interest) in physiological and/or physical attributes of a user at or during specified sections of a media content being presented. Upon detecting a change in the biometric response of the user (e.g., indicating change in interest), control circuitry 304 may utilize a biometric response database to identify who the user associated with the biometric response. Based on this identification, control circuitry 304 may retrieve from storage 308 the corresponding authorization level of the user.

In client-server-based embodiments, control circuitry 304 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which are described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device," "storage circuitry," or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data and guidance application data that are described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, microphone, touch screen, touchpad, stylus input, joystick, voice recognition interface, or other user input interfaces. User input interface 310 may include keys or displayed options that enable a user to instruct control circuitry 304 to access a last content source. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
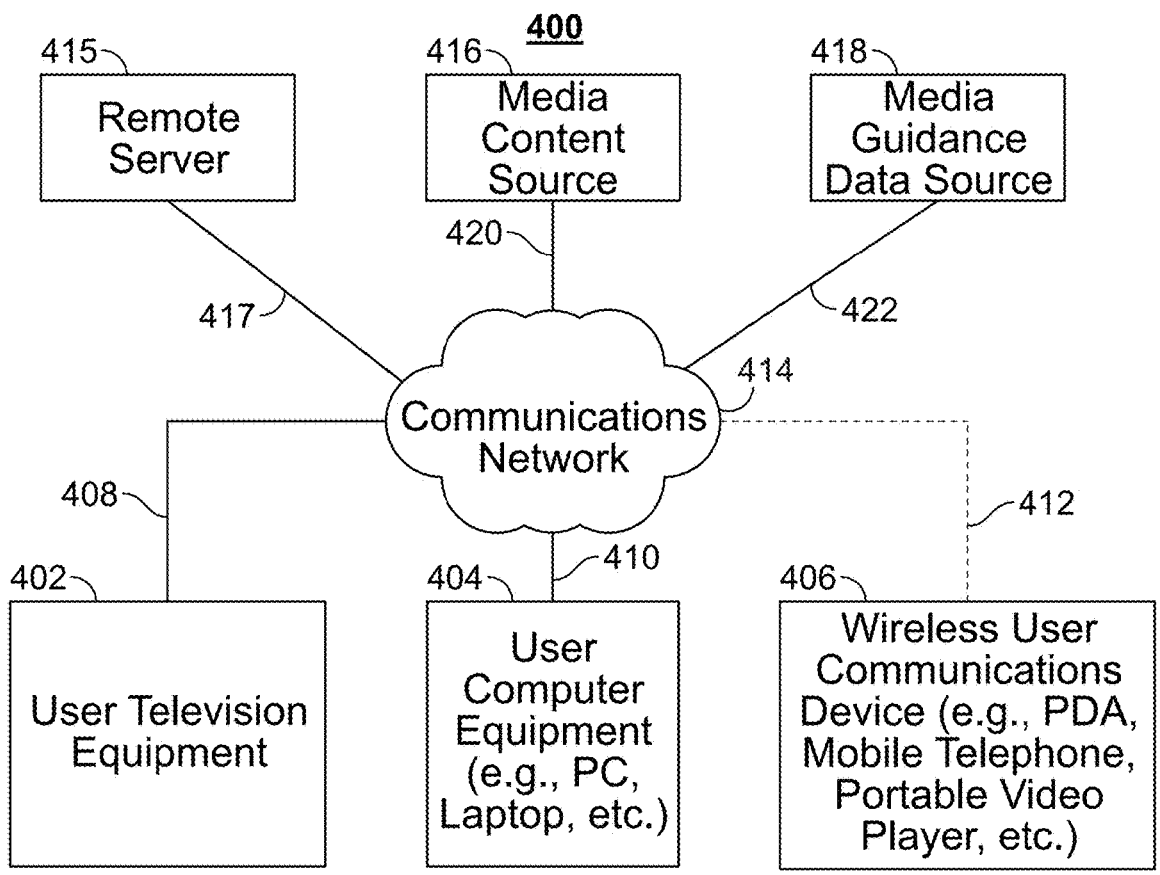
FIG. 4 is a diagram of an illustrative cross-platform interactive media system in accordance with another embodiment of the invention.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a stand-alone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a website accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device (e.g., remote from the first device). For example, the second screen may be associated with a second user (e.g., a parent). In response to determining that content being presented to a first user (e.g., a child) exceeds an authorization level and meets a criterion for longer than a threshold period of time, control circuitry 304 may transmit a communication to the second screen device of the second user. The communication may indicate that the first user is accessing content that exceeds an authorization level of the first user.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the website www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application. For example, a second user (e.g., a parent) may use the remote device to terminate or prevent further access to content being presented on a home device. This may be done in response to receiving the communication that indicates that the first user is accessing content that exceeds an authorization level of the first user.

In some embodiments, the second user may instruct equipment device 300 on which the first user is accessing the content to pause the entertainment. In some embodiments, the second user may instruct equipment device 300 on which the first user is accessing the content to mute the content. In some embodiments, in response to receiving the communication, the second user may establish a communication (e.g., in real-time) with the first user. For example, the second user may send a message (e.g., in real-time) to the first user via e-mail, text, audio call, or video call. The communication from the second user may include a photo or image of the second user or textual message provided by the second user. In some implementations, the communication from the second user to the first user may be sent to the device on which the first user was accessing the content that exceeded the authorization level. In such circumstances, the communication received from the second user may be overlaid on top of the content being presented to the first user. In some implementations, the communication from the second user may include an image or representation of the second user. In such circumstances, in response to receiving the communication at equipment device 300 on which the first user was accessing content, equipment device 300 may render the representation of the second user as a character or player in the content that the first user is accessing.

In some embodiments, the communication from the second user to the first user may be sent to any device within range of the first user (e.g., a second screen device). In some embodiments, in response to receiving the communication, the second user may set additional limits for the first user to continue consuming the content that exceeds the authorization level. In some embodiments, the first and second users may conduct a live voice or video conversation in response to the second user receiving the communication indicating that the first user accessed content that exceeded the authorization level of the first user. In some embodiments, the live conversation may be established during a commercial break portion of the content. For example, equipment device 300 on which the first user is accessing content may transmit a second communication to the second user indicating when the content enters a commercial break and is not presenting a plot segment. When the second user receives that second communication, the second user may establish the voice or video call with the first user.

The user equipment devices may be coupled to communications network 414. Namely, user television equipment 402, user computer equipment 404, and wireless user communications device 406 are coupled to communications network 414 via communications paths 408, 410, and 412, respectively. Each user of the user equipment devices may be associated with different users in a crowd of users. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance application data may be provided to the user equipment devices using any suitable approach. In some embodiments, the guidance application may be a stand-alone interactive television program guide that receives program guide data via a data feed (e.g., a continuous feed or trickle feed).

Program schedule data and other guidance data may be provided to the user equipment on a television channel sideband, using an in-band digital signal, using an out-of-band digital signal, or any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of remote server 415. When executed by control circuitry of remote server 415 (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites, blogs, news sites, or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, access to messages posted by users in a crowd, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

In some embodiments, control circuitry 304 may notify a second user about activity performed by a first user that exceeds an authorization level associated with the first user. The authorization level for the first user may be set using the setup screen discussed in connection with FIG. 5. In response to determining that content being presented to the first user exceeds the authorization level of the first user, control circuitry 304 may retrieve criterion or criteria from storage 308. The criterion or criteria may be set by a user (e.g., using setup screen discussed in connection with FIG. 6) or automatically. Control circuitry 304 may compare the criterion with attributes or characteristics of a media asset currently being presented to the first user. In response to determining that the attributes or characteristics of the media asset matches the criterion set by the user or automatically, control circuitry 304 may start measuring a length of time that the content being presented on the content source continues to match the criterion. Control circuitry 304 may compare the measured length of time with a threshold (set by a user or predetermined) stored in storage 308. In response to determining that the measured length of time exceeds the threshold, control circuitry 304 may instruct communications circuitry to notify the second user about the activity performed by the first user that exceeds the authorization level of the first user.

Figure 5:
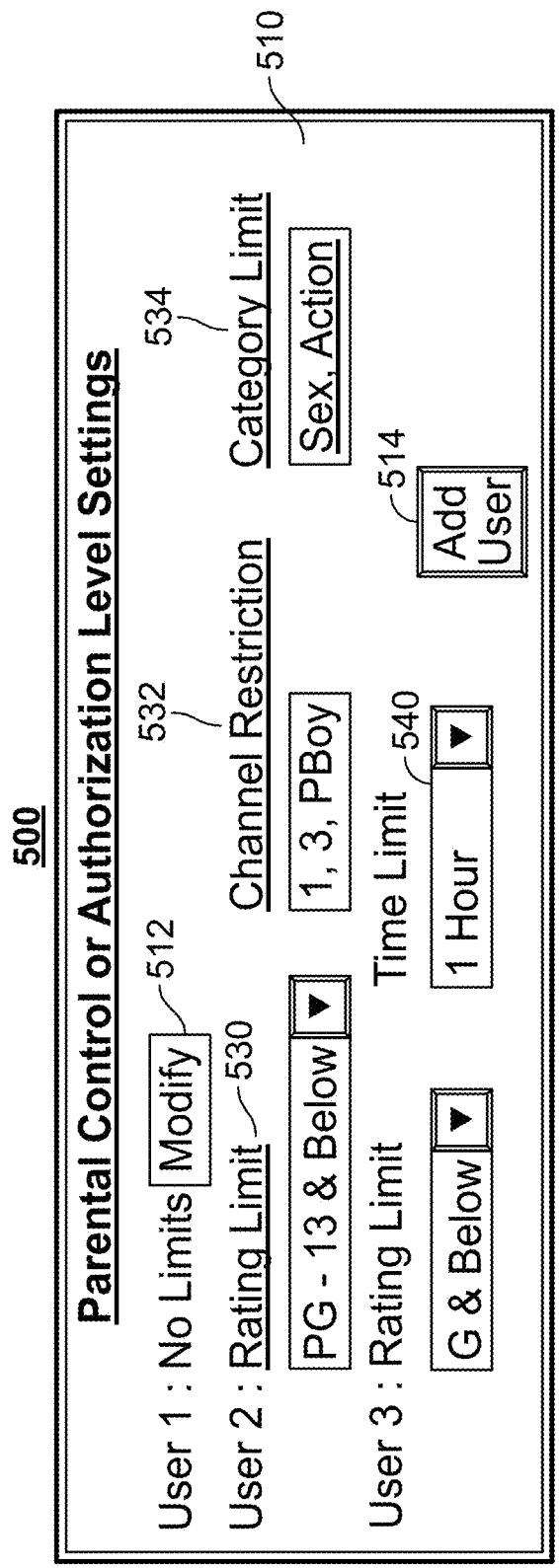
FIG. 5 shows an illustrative display of an authorization level setup screen in accordance with an embodiment of the invention.

FIG. 5 shows an illustrative display screen 500 of setting up parental control restrictions or authorization levels for one or more user in accordance with an embodiment of the invention. Screen 500 includes a parental control settings region 510 that includes options for defining parental control settings for different users. As referred to herein, the phrase "parental control settings" is used interchangeably with the phrase "parental control restrictions" and "authorization level".

Control circuitry 304 may include in parental control settings region 510 an identification of each user and the authorization level associated with the respective user. The identification of each user may include a name of the user, a unique or specific identifier of the user, icon, an image or picture of the user, a video of the user, or the like. For example, a first user may be the master of user equipment device 300 and, accordingly, may be authorized to access all content without restrictions. The first user may be associated with a parental control setting that enables access to content with the highest authorization level. Control circuitry 304 may retrieve from storage 308 the parental control settings associated with the first user and display an indication of the authorization level associated with the retrieved settings next to the identifier of the first user. In particular, control circuitry 304 may determine that the first user has an unlimited authorization level and, accordingly, display an indication that the first user has no limits.

In response to receiving a user selection of modify option 512, control circuitry 304 may allow the user to modify the parental control settings associated with the first user. In some implementations, in response to receiving the user selection of modify option 512, control circuitry 304 may display a prompt requesting authentication (e.g., a PIN code or access code) before allowing any modifications to the parental control settings. In response to verifying the authenticity of the user making the change, control circuitry 304 may display options (similar to options 530, 532, 540 and 534 discussed below) allowing the user to add/remove parental control restrictions that increase or decrease the authorization level associated with the first user. For example, control circuitry 304 may receive input that restricts access to content above an "R" rating to the first user.

Modify option 512 may be provided for each user displayed in region 510 and may require separate authentication to modify each user's parental control settings. After receiving a modification to the parental control settings for a given user, control circuitry 304 may store or update the parental control setting or authorization level, associated with the given user, that is stored in storage 308.

In some embodiments, a second user may be a user having a middle range authorization level. For example, the second user may be a teenage child. Control circuitry 304 may retrieve from storage 308 the parental control settings associated with the second user and display an indication of the authorization level associated with the retrieved settings next to the identifier of the second user. In particular, control circuitry 304 may determine that the second user has a limited authorization level corresponding to content rating, channel numbers or groups, and content categories and, accordingly, control circuitry 304 may display an indication of these for the second user.

Rating limit 630 may indicate what ratings of content the given user is allowed to access. Specifically, any content rating greater than the content rating specified by rating limit 630 may violate the parental control restriction. In response to receiving a user selection of rating limit 630, control circuitry 304 may allow the user to modify the rating limit associated with the parental control settings of the second user. In some implementations, in response to receiving the user selection of rating limit 630, control circuitry 304 may display a prompt requesting authentication (e.g., a PIN code or access code) before allowing any modifications to the parental control settings. In response to verifying the authenticity of the user making the change, control circuitry 304 may receive input that adds/removes ratings the second user is allowed/prevented from accessing and/or increases or decreases the rating authorization level associated with the second user.

Channel restriction 532 may indicate what channels or groups of content sources the given user is allowed to access. Specifically, accessing any channel or group of channels specified by channel restriction 532 may violate the parental control restriction. In response to receiving a user selection of channel restriction 532, control circuitry 304 may allow the user to modify the channel restriction associated with the parental control settings of the second user. In some implementations, in response to receiving the user selection of channel restriction 532, control circuitry 304 may display a prompt requesting authentication (e.g., a PIN code or access code) before allowing any modifications to the parental control settings. In response to verifying the authenticity of the user making the change, control circuitry 304 may receive input that adds/removes channels the second user is prevented from accessing and/or increases or decreases the channel authorization level associated with the second user.

Category limit restriction 534 may indicate what categories of content sources the given user is allowed to access. Specifically, accessing any content source specified by category limit restriction 534 may violate the parental control restriction. In response to receiving a user selection of category limit restriction 534, control circuitry 304 may allow the user to modify the content restriction associated with the parental control settings of the second user. In some implementations, in response to receiving the user selection of category limit restriction 534, control circuitry 304 may display a prompt requesting authentication (e.g., a PIN code or access code) before allowing any modifications to the parental control settings. In response to verifying the authenticity of the user making the change, control circuitry 304 may receive input that adds/removes categories of content sources the second user is prevented from accessing and/or increases or decreases the channel authorization level associated with the second user.

Time limit restriction 540 may indicate how long the given user is allowed to access content with user equipment device 300. Specifically, accessing any content for longer than the amount of time specified in time limit restriction 540 may violate the parental control restriction. In response to receiving a user selection of time limit restriction 540, control circuitry 304 may allow the user to modify the content restriction associated with the parental control settings of the third user. In some implementations, in response to receiving the user selection of time limit restriction 540, control circuitry 304 may display a prompt requesting authentication (e.g., a PIN code or access code) before allowing any modifications to the parental control settings. In response to verifying the authenticity of the user making the change, control circuitry 304 may receive input that increases/decreases the amount of time the third user is allowed to use user equipment device 300 to access content.

In response to receiving a user selection of add user option 514, control circuitry 304 may allow the user to add another user (e.g., user 4) and to specify parental control restrictions for the added user. Parental control restrictions for the added user may be modified in a similar manner as discussed above in connection with the modify option 512.

Although only three different types of content parental control restrictions are shown and described (e.g., rating limits, channel restrictions, and category limits) any other types or number of content restrictions or authorization levels may be defined for the same or different users.

In some embodiments, control circuitry 304 may receive a user input selecting an option to customize criterion/criteria and/or threshold for notifying a second user about activity performed by a first user that exceeds an authorization level of the first user. In response to receiving the user input, control circuitry 304 may navigate the user to screen 600 (FIG. 6) allowing the user to set up various options for the threshold and/or the attributes/characteristics of content being presented that is monitored to determine whether to add a content source from which the content is being received to the list.

Figure 6:
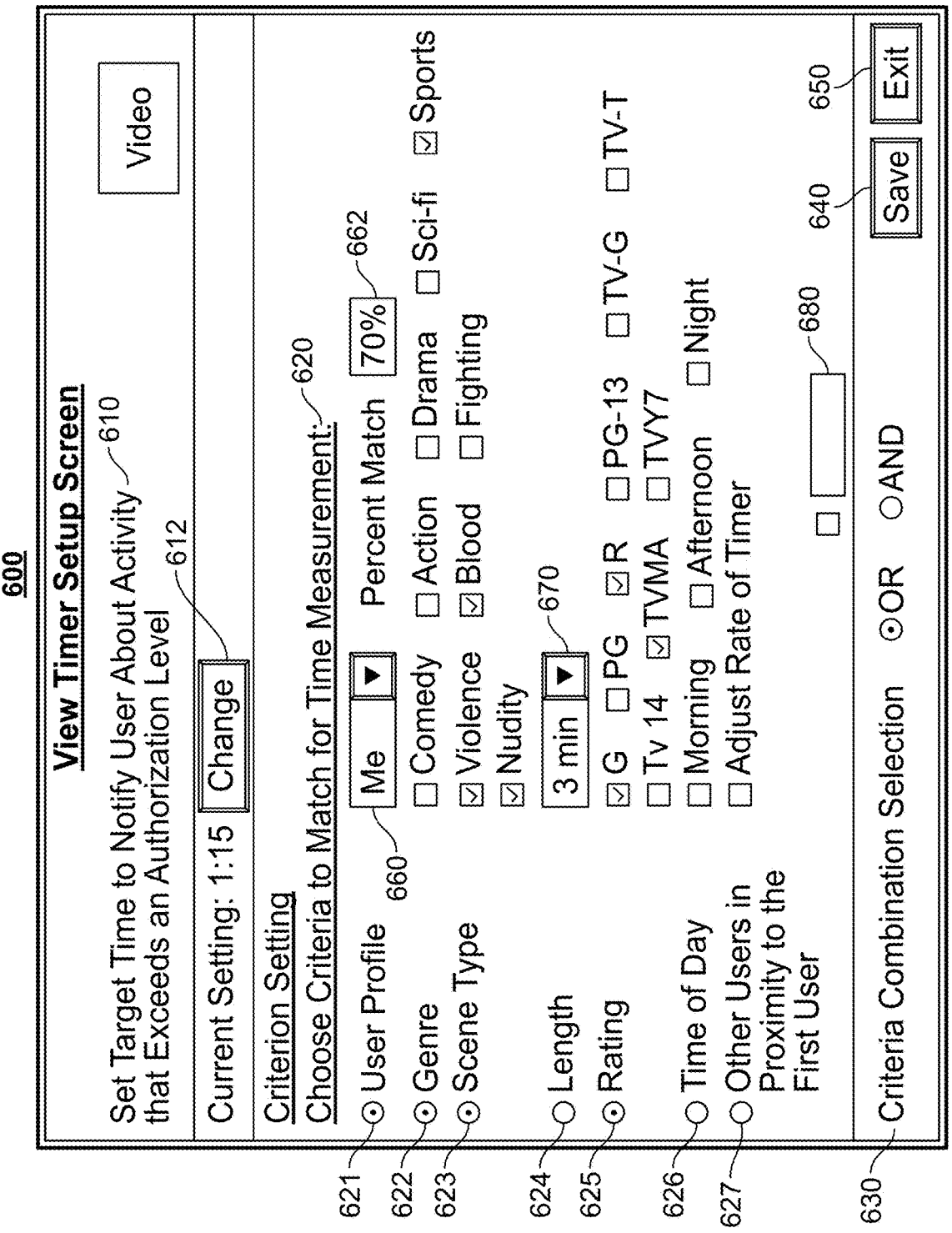
FIG. 6 shows an illustrative display of a view timer setup screen in accordance with an embodiment of the invention.

FIG. 6 shows an illustrative display of a view timer setup screen 600 in accordance with an embodiment of the invention. Screen 600 includes a threshold setup region 610 and a criterion/criteria setup region 620. Region 610 may include options to modify the current value for the timer threshold which may be used to determine when to notify a second user about activity performed by a first user that exceeds an authorization level of the first user. Region 620 may include options to enable a user to select which attributes or characteristics of content being presented to the user has to match the criterion/criteria in order to initiate measurement of time that the content having the attributes/characteristics is being presented. In particular, the measurement of time during which attributes/characteristics of content match criteria/criterion (previously selected) may be conditioned on whether the content currently being shown is associated with attributes/characteristics that match the criteria/criterion. Specifically, control circuitry 304 may retrieve attributes/characteristics of content being accessed and compare the retrieved attributes or characteristics with the criterion/criteria set in region 620 to determine whether to start/continue measuring time which the attributes/characteristics of the content being presented matches the criterion. When the attributes/characteristics of the content being presented from the content source stop matching the criterion/criteria set in region 620, control circuitry 304 pauses or stops the current time measurement and resumes measuring time when the attributes/characteristics of the content being presented from the content source starts matching the criterion/criteria again.

In some embodiments, any selections made in connection with screen 500 or screen 600 may be provided using an external memory device (e.g., a USB controller). In response to control circuitry 304 detecting the external memory device, control circuitry 304 may read any settings associated with screen 500 or screen 600 and store those settings in storage 308 of user equipment device 300. This allows a user to manually move settings from one device to another.

Region 610 may include a display that indicates the current setting for the threshold value. Option 612 may be provided to enable the user to modify the value for the threshold. In response to receiving a user selection of option 612, control circuitry 304 may request input from the user with a new value for the threshold. Control circuitry 304 may receive the value for the threshold from the user and replace the previously stored value in storage 308 with the new value. The user may specify any range of values for the threshold. Control circuitry 304 may use the threshold specified in region 610 to determine when to notify a second user about activity performed by a first user that exceeds an authorization level of the first user. In some implementations, control circuitry 304 may recommend a new threshold value for the user in response to receiving a selection of option 612. Specifically, control circuitry 304 may determine the average viewing time of content on a given channel for the first user. Control circuitry 304 may recommend a threshold value that represents the average viewing time and the user may select the recommended value to replace the current threshold value.

In some embodiments, an option to make the threshold dynamic may be provided (not shown). Setting the threshold to be dynamic may cause the threshold to increase or decrease based on how many criteria a given content being presented matches. For example, content that matches a greater number of criteria may cause a shorter threshold to be used and, consequently, the second user is notified about activity performed by a first user that exceeds an authorization level of the first user more quickly. Alternatively, content that matches a lower number of criteria than another may cause a longer threshold to be used and, consequently, the second user is notified about activity performed by a first user that exceeds an authorization level of the first user after a longer period of time. Specifically, in response to setting the dynamic threshold option, control circuitry 304 may determine how many of the criteria set in region 620 match a piece of content being presented. For each number of criteria that the content being presented matches, control circuitry 304 may decrease the threshold amount by a predetermined number (e.g., 5 seconds). For example, the threshold may be initially set to one minute and 15 seconds. The user may be presented with a content that matches 3 out of 10 criteria. Accordingly, the threshold may be decreased to 1 minute and, consequently, control circuitry 304 may notify the second user about activity performed by a first user that exceeds an authorization level of the first user if the content continues to match the 3 out of 10 criterion for a period of 1 minute.

Region 620 may include various options/settings to change and control what criteria are analyzed and monitored from the content being presented to trigger the measurement of viewing time. Specifically, control circuitry 304 may determine whether attributes or characteristics of the content being presented matches the criteria specified and selected in region 620. In response to determining that the content being presented has attributes/characteristics that match the criteria selected in region 620, control circuitry 304 may initiate or resume measuring how long the content is being presented. The options/settings in region 620 allow the parent user or an adult user to select what content a child user should not be exposed to for over a threshold period of time. Namely, options/settings in region 620 allow the parent user to have control over how much exposure to content having certain attributes and that exceeds an authorization level of a given user the given user can access before the parent is notified about the activity that exceeds the authorization level. These options/settings represent content that one user (e.g., a parent user) does not want another user (e.g., a child user) to access for longer than a threshold period of time.

Region 620 may include a user profile option 621, a genre option 622, a scene type option 623, a length option 624, a rating option 625, a time of day option 626, other users in proximity to the first user option 627 and a team option 628. Other options not shown in region 620 may be provided without departing from the teachings of this invention but are not being discussed for the sake of brevity. Options shown in region 620 are illustrated as radio buttons to indicate that any one or all of the options in region 620 may be selected. The criteria defined by those options in region 620 with a radio button selected are used by control circuitry 304 to match against attributes or characteristics of content being presented to the user. The criteria defined by those options in region 620 with a radio button not selected are ignored or not used by control circuitry 304 to match against attributes or characteristics of content being presented to the user.

User profile option 621 may allow a user to specify one or more user profiles. In response to selecting user profile option 621, control circuitry 304 may present a user profile selection menu 660. User profile selection menu 620 may list all of the profiles stored in storage 308, profiles retrieved from a social network, the cloud, or any other profile. The user may select any one or all of the profiles listed in menu 620. As part of the process of determining whether the attributes/characteristics of the content being presented matches the criteria specified in region 620, control circuitry 304 may determine whether attributes of the content meet or exceed preferences stored in the selected profile(s) when option 621 is selected. For example, the parent user may select his/her own profile using user profile option 621. As such, whenever a child user accesses content that matches the interests of the parent, and that content is viewed by the child user for a threshold period of time, the parent user will be notified.

In some implementations, a percent match selection option 662 may be provided. The user may input a percentage in option 662 to indicate a threshold value for which attributes/characteristics of content being presented have to exceed in matching preferences stored in the profiles selected in menu 660. For example, control circuitry 304 may compute a Euclidian distance between attributes/characteristics of content being presented and preferences stored in the profile(s) selected in menu 660. Control circuitry 304 may derive a percentage match from the computed Euclidian distance and compare the percentage to the percentage specified in option 662. In response to determining that the percentage match exceeds the percentage specified in option 662, control circuitry 304 may determine that the attributes/characteristics of the content being presented matches the criteria of the user profile option 621. When no value is specified in option 662, control circuitry 304 may determine whether an average number of attributes/characteristics of the content being presented matches the preferences specified in the profile(s) selected in menu 660.

Genre option 622 may allow a user to specify a genre for use in comparing against attributes or characteristics of content being presented to the user. In response to selecting genre option 622, control circuitry 304 may present a list of various genres (e.g., comedy, action, drama, sci-fi, sports, etc.), categories and/or combination categories. The user may select any one or all of the genres, categories and/or combination categories listed for option 622. As part of the process of determining whether the attributes/characteristics of the content being presented matches the criteria specified in region 620, control circuitry 304 may determine whether a genre, category, and/or combination category of the content being presented meets the selected genres, categories and/or combination categories for option 622 when option 622 is selected.

Scene type option 623 may allow a user to specify a scene type for use in comparing against attributes/characteristics of content being presented to the user. In response to selecting scene type option 623, control circuitry 304 may present a list of content types (e.g., animated, violence, nudity, blood, fighting, etc.). The user may select any one or all of the types listed for option 623. As part of the process of determining whether the attributes/characteristics of the content being presented matches the criteria specified in region 620, control circuitry 304 may determine whether a type of the content being presented meets the selected type for option 623 when option 623 is selected. For example, control circuitry 304 may determine a progression point within the content being accessed beyond the starting point of the content. Control circuitry 304 may cross-reference the progression point and the identifier (e.g., title) of the content with a database of content types to retrieve the content type associated with the progression point of the content. Control circuitry 304 may compare the retrieved content type with those selected in scene type option 623 to determine whether a match exists.

In some implementations, control circuitry 304 may adjust the rate of the timer based on one or more criteria. For example, control circuitry 304 may increase the rate of the timer for some scene types and decrease the rate of the timer for other scene types. Increasing the rate of the timer will cause the threshold to be reached at a faster pace and thereby increase the likelihood that the communication will be transmitted to the second user indicating that the first user is accessing content that exceeds the authorization level. Decreasing the rate of the timer will cause the threshold to be reached at a slower pace and thereby increase the likelihood that the communication will be transmitted to the second user indicating that the first user is accessing content that exceeds the authorization level.

Length option 624 may allow a user to specify a duration for use in comparing against attributes or characteristics of content being presented to the user. In response to selecting length option 624, control circuitry 304 may present a drop-down menu 670 with a list of durations for content (e.g., 3 minutes, 1 hour, 2 hours, user specified duration, etc.). The user may select any one or all of the durations listed in menu 670. As part of the process of determining whether the attributes/characteristics of the content being presented match the criteria specified in region 620, control circuitry 304 may determine whether duration of the content being presented meets the duration specified in menu 670 when option 624 is selected.

Rating option 625 may allow a user to specify a rating for use in comparing against attributes or characteristics of content being presented to the user. In response to selecting rating option 625, control circuitry 304 may present a list of ratings (e.g., G, PG, R, PG-13, TV-G, TV-T, TV14, TVMA, TVY7, etc.). The user may select any one or all of the ratings listed for option 625. As part of the process of determining whether the attributes/characteristics of the content being presented match the criteria specified in region 620, control circuitry 304 may determine whether a rating assigned to the content being presented meets or exceeds the selected rating for option 625 when option 625 is selected.

Time of day option 626 may allow a user to specify a time of day for use in comparing against attributes/characteristics of content being presented to the user. In response to selecting time of day option 626, control circuitry 304 may present a list of times of day (e.g., morning, afternoon, night, user specified time range, etc.). The user may select any one or all of the times of day listed for option 626. As part of the process of determining whether the attributes or characteristics of the content being presented match the criteria specified in region 620, control circuitry 304 may determine whether a time of day in which the content is being presented meets the selected time(s) of day for option 626 when option 626 is selected.

Other users in proximity to the first user option 627 may allow a user to select whether to identify the presence of other users in proximity to the first user accessing content. Option 627 may allow the user to select how many other users are in proximity to the first user. Option 627 may allow the user to specify particular other users and/or type of other users (e.g., demographic information of those users). In response to option 627 being selected, control circuitry 304 may determine who else is in the vicinity or proximity of the first user (e.g., the child user) while content is being presented to the first user. Control circuitry 304 may also determine demographic information associated with the other users. In response to determining that other users are in proximity to the first user (and optionally that those users are associated with a given demographic attribute, such as over 18 years old) while the content is being presented to the first user, control circuitry 304 may adjust a speed or rate of the timer used to measure for how long content being presented matches the criteria.

For example, if the first user is accessing content that exceeds an authorization level of the first user, control circuitry 304 may determine whether other users are in proximity to the first user. In some implementations, control circuitry 304 may determine whether other users are in proximity when another person is detected within less than a threshold distance (e.g., 10 feet) of the first user or if another person is within a perceivable range of equipment device 300 used to present the content to the first user. When other users are determined to be within the proximity of the first user, control circuitry 304 may slow down the rate at which the timer runs. This will cause the threshold to be reached at a slower pace and thereby lower the likelihood that the communication will be transmitted to the second user indicating that the first user is accessing content that exceeds the authorization level. This is because there is a greater likelihood that the threshold will not be reached as the content may be changed by one of the other users before the timer reaches the threshold. Alternatively, when other users are determined not to be within the proximity of the first user, control circuitry 304 may increase the rate at which the timer runs. This will cause the threshold to be reached at a faster pace and thereby increase the likelihood that the communication will be transmitted to the second user indicating that the first user is accessing content that exceeds the authorization level.

Region 620 may include a commercial option (not shown). In response to selecting the commercial option, control circuitry 304 may, as part of the process of determining whether the attributes/characteristics of the content being presented match the criteria specified in region 620, determine whether the content is in a commercial break (e.g., a portion of the program that is an advertisement and not a plot portion). Specifically, content presented to the user may be a program that has multiple plot portions with commercial breaks or interruptions between the plot portions. When the commercial option is selected, control circuitry 304 may determine whether the content being presented is in the plot portion or is in a commercial break. If the content being presented is in a commercial break and the commercial option is selected, control circuitry 304 may determine that the content does not match criteria set in region 620. Alternatively, if the content being presented is in a commercial break and the commercial option is not selected, control circuitry 304 may determine that the content does match criteria set in region 620.

Region 620 may include a biometric response condition option (not shown). In response to selecting the biometric response condition option, control circuitry 304 may, as part of the process of determining whether the attributes/characteristics of the content being presented match the criteria specified in region 620, determine biometric response of the user (e.g., a heart rate, attention, face direction, breathing rate, focus, eye gazing, user's presence within range of the screen, etc.) to determine whether the user is interested or is paying attention to the content being presented. If the biometric response of the user indicates that the user is interested in or is paying attention to the content being presented and the biometric response condition option is selected, control circuitry 304 may determine that the content does match criteria set in region 620. Alternatively, if the biometric response of the user indicates that the user is not interested in or is not paying attention to the content being presented and the biometric response condition option is selected, control circuitry 304 may determine that the content does not match criteria set in region 620.

Region 620 may also include a criteria combination selection option 530. Option 630 may allow a user to specify how options 621-627 are logically combined in comparing against attributes/characteristics of content being presented to the user. Specifically, option 630 may include a logical OR option and a logical AND option. In response to receiving a user selection of the logical OR option in option 530, control circuitry 304 may determine that the content being presented to the user matches the criteria/criterion set in region 620 if the attributes/characteristics of the content match any one of selected options 621-627 in region 620. For example, control circuitry 304 may determine that the content being presented to the user matches the criteria set in region 620 if the genre of the content matches the genre selected for option 622 even though the content being presented does not match a rating specified for option 625 (e.g., the content may be rated R and the selected rating for option 625 may be G or lower).

In response to receiving a user selection of the logical AND option in option 630, control circuitry 304 may determine that the content being presented to the user matches the criteria set in region 620 if the attributes/characteristics of the content match every one of selected options 621-627 in region 620. For example, control circuitry 304 may determine that the content being presented to the user matches the criteria set in region 620 if the genre of the content matches the genre selected for option 622 and the content being presented matches a rating specified for option 625. Similarly, control circuitry 304 may determine that the content being presented to the user fails to match the criteria set in region 620 if the genre of the content matches the genre selected for option 622 and the content being presented does not match a rating specified for option 625.

Control circuitry 304 may first determine the outcome of every option 621-627 selected for region 620 when compared with the content being presented to the user. The outcome of every option 621-627 may be logically TRUE when an attribute of the content being presented matches the criterion set for a given option 621-627. For example, the outcome may be TRUE when time of day option 626 is selected to be morning and the time at which the content being presented to the user is between 8 AM-11 AM. The outcome of every option 621-627 may be logically FALSE when an attribute of the content being presented fails to match the criterion set for a given option 621-627.

After determining the outcome of every option 621-627 that is selected, control circuitry 304 may determine whether option 630 is selected to be a logical OR or a logical AND. When option 630 specifies a logical OR was selected, control circuitry 304 may determine whether the outcome of any selected option 621-627 was TRUE. If the outcome of any selected option 621-627 was TRUE, control circuitry 304 may determine that the content being presented to the user matches criteria set in region 620. Consequently, control circuitry 304 may start or continue to measure an amount of time that the content is presented to the user. When option 630 specifies a logical AND was selected, control circuitry 304 may determine whether the outcome of every selected option 621-627 was TRUE. If the outcome of any selected option 621-627 was FALSE, control circuitry 304 may determine that the content being presented to the user does not match criteria set in region 620. Consequently, control circuitry 304 may pause or not measure an amount of time that the content is presented to the user.

In some embodiments, control circuitry 304 may sequentially determine whether an outcome of a given option 621-627 when compared with the content being presented to the user meets the selected logical operation specified in option 630. This is to avoid having to first compute and determine whether the content being presented to the user matches all of the selected options and then determining whether the logical operation is met. Specifically, control circuitry 304 may first determine whether option 630 is selected to be a logical OR or a logical AND. After determining whether option 630 is selected to be a logical OR or a logical AND operation, control circuitry 304 may determine an outcome of a first of options 621-627 selected for region 620 when compared with the content being presented to the user. If option 630 is selected to be a logical OR and in response to determining that the outcome of the first of selected options 621-627 is FALSE, control circuitry 304 may next determine an outcome of a second of options 621-627. If option 630 is selected to be a logical OR and in response to determining that the outcome of the first of selected options 621-627 is TRUE, control circuitry 304 may stop testing outcomes of the remaining selected options 621-627 and may determine that the content being presented meets criteria/criterion set in region 620. If option 630 is selected to be a logical AND and in response to determining that the outcome of the first of selected options 621-627 is FALSE, control circuitry 304 may stop testing outcomes of the remaining selected options 621-627 and may determine that the content being presented fails to meet criteria/ criterion set in region 620. If option 630 is selected to be a logical AND and in response to determining that the outcome of the first of selected options 621-627 is TRUE, control circuitry 304 may next determine an outcome of a second of options 621-627 until outcomes of all of the selected options 621-627 are determined to be TRUE.

Control circuitry 304 may continue to make the determinations of whether the content being presented matches the selected options 621-627 until all of the selected options are tested or until control circuitry 304 determines that the logical operation is TRUE. Specifically, in the case of option 630 being selected to be an OR operation, control circuitry 304 may continue to make the determinations of whether the content being presented matches the selected options 621-627 until all of the selected options are tested or until control circuitry 304 determines that the logical operation is TRUE. In the case of option 630 being selected to be an AND operation, control circuitry 304 may continue to make the determinations of whether the content being presented matches the selected options 621-627 until all of the selected options are tested and determined to be TRUE or until control circuitry 304 determines that the logical operation is FALSE (i.e., any one of the outcomes of selected options 621-627 is determined to be FALSE).

A save option 640 may be included in display 600. In response to receiving a user selection of save option 640, control circuitry 304 may store all of the options selected in regions 610 and 620 and return the user to the previous screen (e.g., the content being presented previously). An exit option 650 may be included in display 600. In response to receiving a user selection of exit option 650, control circuitry 304 may discard all of the options selected in regions 610 and 620 and return the user to the previous screen (e.g., the content being presented previously).

In some embodiments, when a first user accesses content (e.g., when the user changes channels), control circuitry 304 may determine whether the content presented exceeds an authorization level of the first user. In response to determining that the content presented exceeds the authorization level, control circuitry 304 may determine whether the content matches a criterion or criteria. In response to determining that the content being presented matches the criterion or criteria, control circuitry 304 may start measuring time (e.g., may start a timer) while the content being presented matches the criterion or criteria. Control circuitry 304 may continuously or periodically determine whether the content matches the criterion or criteria and when the content being presented stops matching the criterion or criteria (e.g., the content enters a commercial interruption), control circuitry 304 may pause measuring time (e.g., may store the current value of a timer). When the content being presented resumes matching the criterion or criteria (e.g., the content enters a commercial interruption), control circuitry 304 may resume measuring time (e.g., may retrieve the value of a timer stored in memory and continue the timer).

In response to determining that the measured time meets or exceeds a threshold, control circuitry 304 may instruct communications circuitry to transmit a communication to a second user informing the second user about the activity performed by the first user that exceeds the authorization level. When the second user receives the communication, the second user can remotely control user equipment device 300 on which the first user is accessing the content. For example, the second user may instruct user equipment device 300 to turn off or prevent the content from being further accessed by the first user.

In some embodiments, a user may select a content source (e.g., a television channel) and control circuitry 304 may access the selected content source (e.g., tune to the selected television channel). For example, control circuitry 304 may receive a user selection of a program listing from grid 102 and in response may tune to the television channel corresponding to the selected listing. In some implementations, to identify the user who is requesting access to the content, control circuitry 304 may request that the user log in (e.g., provide a unique code, or code specific to the user, fingerprint of the user) before enabling access to the content. In some implementations, input interface 310 may include a fingerprint reader to enable the user to log in using the fingerprint. Based on the login information provided by the user, control circuitry 304 may identify who the user is that is requesting access to the content. Control circuitry 304 may display content received from the content source. For example, control circuitry 304 may display the video of the program received from the television channel. Control circuitry 304 may identify who the user is that selected the content source and is accessing the content. Control circuitry 304 may retrieve a profile associated with the user and the authorization level associated to the user. For example, control circuitry 304 may retrieve the authorization level assigned to the user using screen 500 (FIG. 5).

Control circuitry 304 may determine whether the user is authorized to access the requested content. Specifically, control circuitry 304 may determine whether the content exceeds the retrieved authorization level of the user.

In response to determining that the content exceeds the authorization level of the user, control circuitry 304 may initialize a view timer (e.g., set a counter to zero). Control circuitry 304 may determine whether attributes of the accessed content match criteria selected in region 620 (FIG. 6) or some other predefined default criteria (e.g., whether the content is in a commercial break or not). The above and below discussions pertain to an implementation where attributes/characteristics of content being presented are compared with criteria/criterion set in region 620. However, the teachings of this disclosure apply similarly to embodiments where criteria/criterion are not selected in region 620 but are set to default value(s). For example, the system may be set up to check whether content being presented is of a certain genre or has a scene type and condition whether time should continue to be measured or paused based on this check.

In response to determining that the attributes of content 610 match the criteria selected in region 620, control circuitry 304 may start the view timer. Based on the criteria selected in region 620, control circuitry 304 may also adjust the timer rate (e.g., speed up or slow down the timer based on the criteria selected in region 620 that matches the content). Control circuitry 304 may periodically or continuously monitor the attributes of the content. For example, control circuitry 304 may analyze closed-caption data or may request updated data structures for the content being presented on the selected content source from a local or remote database. While attributes of the content being presented continue to match the criteria selected in region 620, the view timer may continue to count or measure time. However, upon determining that the attributes of content being presented changed and no longer match the criteria selected in region 620, control circuitry 304 may pause (e.g., stop) the view timer. While the view timer is paused, control circuitry 304 may periodically or continuously monitor the attributes of the content in a similar manner as discussed above to determine whether attributes of the content changed to again match the criteria selected in region 620. When the attributes of the content change to again match the criteria selected in region 620, control circuitry 304 may resume the view timer (e.g., may resume measuring time from the last point at which it was stopped).

For example, a user may select the FOX television channel as a content source. Control circuitry 304 may tune to the FOX television channel and display video of the show "Family Guy" currently being received on that channel. Upon tuning to the selected channel, control circuitry 304 may determine whether the user is authorized to view the channel (e.g., whether access to the channel exceeds an authorization level of the user). In response to determining that access to the channel exceeds the authorization level of the user, control circuitry 304 may initialize the view counter (e.g., set the timer to the value "0"). Control circuitry 304 may determine that "Family Guy" is associated with a genre attribute, comedy, and is currently presenting a scene type of violence. Control circuitry 304 may determine that criteria selected in region 620 are: genre option 622 with a setting of comedy and scene type option 623 with a setting of violence. Accordingly, control circuitry 304 may determine that the genre attribute of the show "Family Guy" matches the criteria set in region 620. In response to determining that the attributes of the show match, control circuitry 304 may instruct the view timer to start measuring time (e.g., count time up or increment periodically, such as every second).

While the show "Family Guy" is being presented on the selected television channel FOX, control circuitry 304 may monitor the attributes of the show. Control circuitry 304 may determine that, after 20 seconds of presenting the show, the one of the attributes that was determined to match (e.g., scene type of violence) no longer matches. Specifically, control circuitry 304 may determine that the current progression point of the show is associated with an animated scene type and therefore does not match the violence scene type that was selected in region 620. Accordingly, control circuitry 304 may determine that although the same content is being presented (e.g., the show "Family Guy"), the content now includes attributes that no longer match the criteria set in region 620 (FIG. 6). In response, control circuitry 304 may instruct the view timer to stop measuring time (e.g., pause time at 20 seconds) and continue presenting video of the show to the user.

Control circuitry 304 may monitor the attributes of the show while the timer is paused, and after another 2 minutes of the timer being paused at 20 seconds, control circuitry 304 may determine that the show includes attributes that match the attributes set in region 620 (e.g., the show is no longer in an animated portion of the plot and returned to a violence portion). Accordingly, control circuitry 304 may instruct the view timer to resume measuring time from the previous paused portion. In this scenario, although the user has watched or been presented with the content on the selected content source for 2 minutes and 20 seconds, only 20 seconds are measured by the view timer reflecting only the portions of time that the content being presented included attributes that match criteria set in region 620.

In some embodiments, control circuitry 304 may retrieve a threshold set in region 610 (FIG. 6) from storage 308. Specifically, control circuitry 304 may retrieve from storage 308 a value assigned to the threshold for determining when to transmit a communication to the second user indicating that the first user is accessing content that exceeds an authorization level of the first user. Control circuitry 304 may store the value of the threshold in the view timer. The view timer may continuously or periodically compare the current view timer value (for a given content source) with the stored threshold. When the view timer determines that the current view timer value exceeds the threshold, the view timer may generate an interrupt in control circuitry 304. For example, the view timer may transmit a communication or signal to control circuitry 304 indicating that the view time for the content source from which the content is being presented has exceeded the threshold value. In response to the interrupt, communication or signal, control circuitry 304 may transmit an instruction to communications circuitry indicating to communications circuitry to send a communication to the second user indicating that the first user is accessing content that exceeds an authorization level of the first user.

Figure 7:
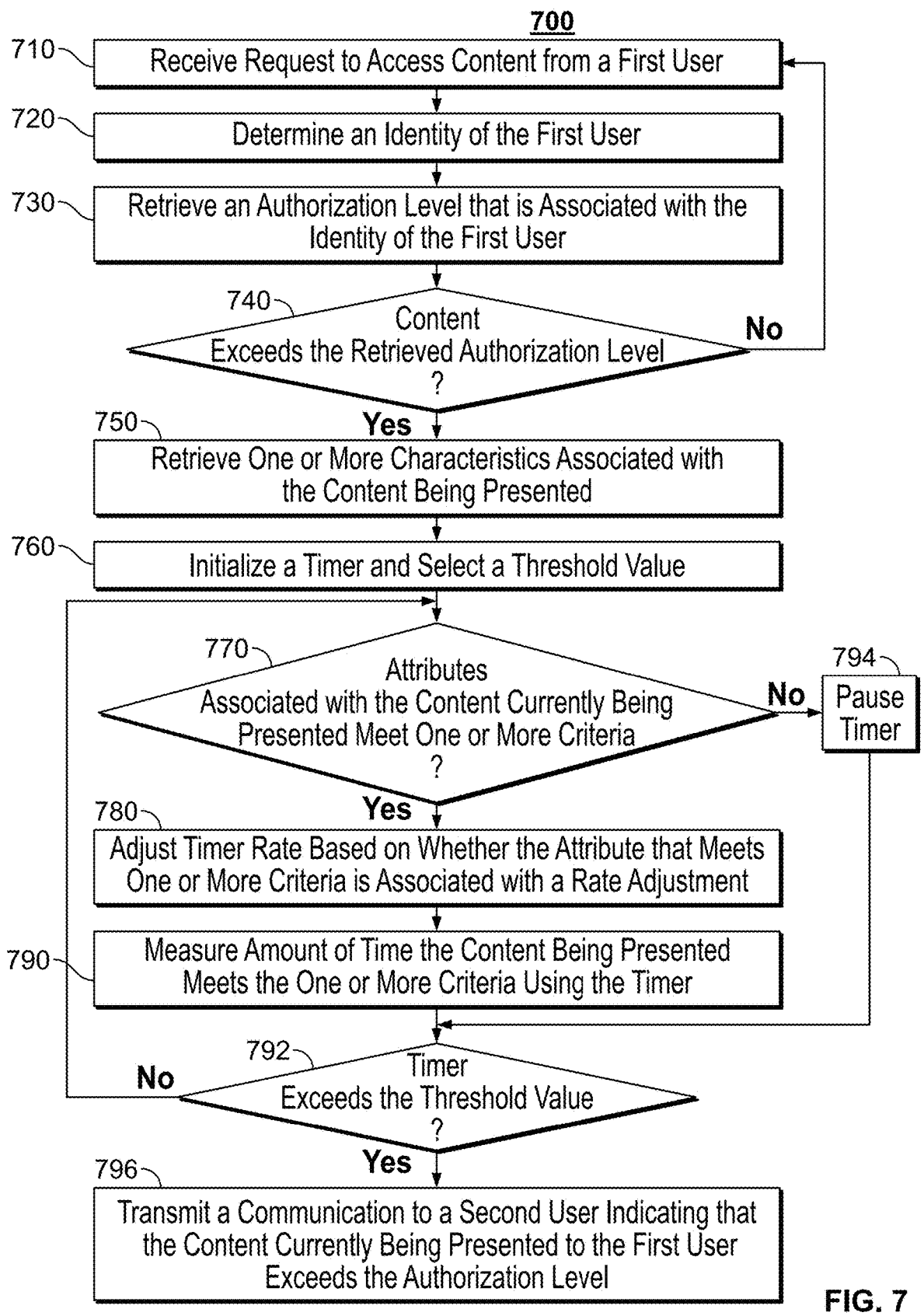
FIG. 7 shows an illustrative flow diagram of a process for notifying a user when activity exceeds an authorization level in accordance with an embodiment of the invention.

FIG. 7 shows an illustrative flow diagram of a process 700 for notifying a user when activity exceeds an authorization level in accordance with an embodiment of the invention. At step 710, a request to access content is received from a first user. For example, a first user using user equipment device 300 may request control circuitry 304 to change the content source (e.g., channel) or request that content be streamed from a given source. The request may be performed by the user selecting a program listing from the grid shown in FIG. 1 or mosaic shown in FIG. 2.

At step 720, the identity of the first user is determined. For example, control circuitry 304 may query the first user to input a code or unique/specific identifier of the first user in response to receiving the request to access the content. In some implementations, control circuitry 304 may identify the first user based on biometric information associated with the first user (e.g., a biometric signature). In some implementations, control circuitry 304 may identify the first user based on verbal input supplied by the first user (e.g., a voice signature). In some implementations, control circuitry 304 may identify the first user by scanning a fingerprint of the first user.

At step 730, an authorization level that is associated with the identity of the first user is retrieved. For example, based on information stored in storage 308 that is input using screen 500 (FIG. 5), control circuitry 304 may cross-reference the identity of the first user with a list of users for which an authorization level is specified in screen 500. Control circuitry 304 may retrieve the authorization level associated with the first user from storage 308. For example, control circuitry 304 may retrieve an authorization level that indicates the first user is allowed to consume or access content on user equipment device 300 for a total of less than one hour and for content that has a rating of 'G' and below.

At step 740, a determination is made as to whether the content requested exceeds the retrieved authorization level. In response to determining that the content exceeds the authorization level, the process proceeds to step 750, otherwise the process proceeds to step 710. For example, control circuitry 304 may compare attributes or characteristics of the requested content with the authorization level to determine whether the attributes or characteristics exceed the authorization level.

At step 750, one or more characteristics or attributes associated with the requested content that is being presented are retrieved. For example, control circuitry 304 may retrieve a title and content source identifier (or current time and content source identifier) of the content being presented and prepare an SQL query that includes this information. Control circuitry 304 may transmit the SQL query to a local or remote database. The local or remote database may identify a data structure associated with the content identified by the information in the SQL query. The data structure may include characteristics or attributes of the content. The local or remote database may transmit back to control circuitry 304 the data structure with the characteristics or attributes of the content currently presented to the user. In some implementations, control circuitry 304 may perform an on-the-fly or real-time analysis of the video, audio or metadata associated with the content being presented to determine a characteristic or attribute of the content. In some implementations, control circuitry 304 may cross-reference a progression point within the content with a database of progression point attributes or characteristics to identify the attribute or characteristic associated with a given scene of the content being presented.

At step 760, a timer is initialized, criteria for conditioning time measurement are retrieved, and a threshold value is selected. For example, control circuitry 304 may set a timer data structure to zero and retrieve one or more criteria set in region 620 (FIG. 6) from storage 308 or may retrieve a predefined set of criteria stored in storage 308 as default criteria. Control circuitry 304 may store the timer data structure in storage 308.

At step 770, a determination is made as to whether the characteristic or attribute of the content being presented meets or matches a criterion/criteria that is retrieved. In response to determining the characteristic or attribute of the content meets or matches criterion/criteria, the process proceeds to step 780, otherwise the process proceeds to step 794. For example, control circuitry 304 may retrieve from the data structure associated with the content being presented one or more content characteristics or attributes and compare those characteristics or attributes to the criteria selected or set in region 620.

At step 780, a timer rate of the timer is adjusted based on whether the attribute that meets one or more criteria is associated with a rate adjustment. For example, control circuitry 304 may determine that the one or more criteria relates to another user being within proximity of the first user. In such circumstances, control circuitry 304 may determine whether there is another user within proximity of the first user and in response may decrease the timer rate. Alternatively, control circuitry 304 may determine whether there is not another user within proximity of the first user and in response may increase the timer rate.

At step 790, an amount of time the content being presented meets the one or more criteria is measured using the adjusted timer (or unadjusted timer). Control circuitry 304 may retrieve the timer from storage 308. For example, the timer may be incremented every second to measure the amount of time that content with attributes or characteristics matching the criterion is being presented. When the timer was previously paused, control circuitry 304 may resume measuring time from the point at which it was paused based on the previously stored timer data structure in storage 308.

At step 794, the timer of content that is currently being presented and meets the criterion or criteria is paused. For example, the current time measured by the timer may be stored in storage 308 and retrieved when the time measurement needs to be resumed.

At step 792, a determination is made as to whether the timer exceeds a threshold. In response to determining the timer exceeds a threshold, the process proceeds to step 796; otherwise the process proceeds to step 770. For example, control circuitry 304 may compare the value of the timer (continuously or periodically) with a threshold set in region 610 (FIG. 6) to determine whether the threshold is met or exceeded.

At step 796, a communication is transmitted to a second user indicating that the content currently being presented to the first user exceeds the authorization level of the first user. For example, control circuitry 304 may instruct communications circuitry to send a message to the second user (e.g., to a second screen device or another user equipment device 300). In some implementations, the communication may include an identifier of the content, identifier of the first user, indication of what authorization level was exceeded and options to control equipment device 300 on which the content is being accessed by the first user. The second user may initiate a voice or video call with the first user in response to receiving the communication. The second user may pause or terminate access to the content by the first user by transmitting a communication back to equipment device 300 on which the first user is accessing the content. In some implementations, an image of the second user may be provided to the first user on user equipment device 300 in response to transmitting the communication to the second user. In some implementations, the second user may transmit a communication back to equipment device 300 on which the first user is accessing the content that increases or changes the authorization level of the first user and allows the first user to continue accessing the content on equipment device 300.

It should be understood that, as discussed above, the second user and first user are operating different equipment devices 300 in accordance with embodiments of this invention. In some implementations, the first and second users are in different geographical locations (e.g., remote from each other, in different rooms in a household, in different countries, in different buildings, etc.).

It should be understood that the above steps of the flow diagram of FIG. 7 may be executed or performed in any order or sequence not limited to the order and sequence shown and described in the figure. Also, some of the above steps of the flow diagram of FIG. 7 may be executed or performed substantially simultaneously where appropriate or in parallel to reduce latency and processing times.

The above-described embodiments of the present disclosure are presented for purposes of illustration and not of limitation, and the present disclosure is limited only by the claims which follow.

What is claimed is:

1. A method for detecting unauthorized access of a content item with multiple portions, the method comprising:
receiving criteria for unauthorized access, the criteria comprising a time length and a keyword;
monitoring metadata of current content output of a first portion of the content item by a first device to determine that the output of the first portion of the content item meets the keyword of the criteria;

in response to the determining that the output of the first portion of the content item meets the keyword of the criteria, starting a timer;
monitoring metadata of current content output of a second portion of the content item to determine that the output of the second portion of the content item does not meet the keyword of the criteria;
in response to the determining that the output of the second portion of the content item does not meet the keyword of the criteria, pausing the timer;
monitoring metadata of current content output of a third portion of the content item by a first device to determine that the output of the third portion of the content item meets the keyword of the criteria;
in response to the determining that the output of the third portion of the content item meets the keyword of the criteria, resuming the timer; and
in response to determining that duration of time tracked by the timer is longer than the time length of the criteria, transmitting an unauthorized access communication to a second device.

2. The method of claim 1, further comprising:
determining whether a first portion of the at least one portion of the content item corresponds to a program segment or an advertising segment; and
in response to determining that the first portion of the at least one portion of the content item corresponds to the advertising segment, selecting a different portion of the content item.

3. The method of claim 1, further comprising:
determining a progression point in the content past a starting point of the content item;
identifying a type of the content at the progression point; and
retrieving the criteria based on the type of the content item at the progression point from metadata associated with the content.

4. The method of claim 3, further comprising:
retrieving the time length criteria based on the type of the content at the progression point.

5. The method of claim 1, further comprising:
receiving criteria for unauthorized access based on user profile data.

6. The method of claim 1, wherein the second device is at a location remote from the first device, and wherein the communication enables the second device to prevent further access to the first device.

7. The method of claim 1, wherein determining a duration of time tracked by the timer has been outputted for longer than the time length of the criteria comprises measuring an amount of time at a faster rate when the content is of a first type and measuring the amount of time at a slower rate when the content is of a second type.

8. The method of claim 1, further comprising adjusting the time length criteria based on at least one of a number of other user devices within proximity of the first device and an attribute of another device within the proximity of the first device.

9. The method of claim 1, wherein the criteria for unauthorized access corresponds to a content rating.

10. The method of claim 1, wherein the first portion of the content item, the second portion of the content item, and the third portion of the content item are different scenes of the content item.

11. A system for detecting unauthorized access of a content item with multiple portions, the system comprising control circuitry configured to:
receive criteria for unauthorized access, the criteria comprising a time length and a keyword;
monitor metadata of current content output of a first portion of the content item by a first device to determine that the output of the first portion of the content item meets the keyword of the criteria;
in response to the determining that the output of the first portion of the content item meets the keyword of the criteria, start a timer;
monitor metadata of current content output of a second portion of the content item to determine that the output of the second portion of the content item does not meet the keyword of the criteria;
in response to the determining that the output of the second portion of the content item does not meet the keyword of the criteria, pause the timer;
monitor metadata of current content output of a third portion of the content item by a first device to determine that the output of the third portion of the content item meets the keyword of the criteria;
in response to the determining that the output of the third portion of the content item meets the keyword of the criteria, resume the timer; and
in response to determining that duration of time tracked by the timer is longer than the time length of the criteria, transmit an unauthorized access communication to a second device.

12. The system of claim 11, wherein the control circuitry is further configured to:
determine whether a first portion of the at least one portion of the content item corresponds to a program segment or an advertising segment; and
in response to determining that the first portion of the at least one portion of the content item corresponds to the advertising segment, select a different portion of the media content.

13. The system of claim 11, wherein the control circuitry is further configured to:
determine a progression point in the content past a starting point of the content item;
identify a type of the content at the progression point; and
retrieve the criteria based on the type of the content item at the progression point from metadata associated with the content.

14. The system of claim 13, wherein the control circuitry is further configured to:
retrieve the time length criteria based on the type of the content at the progression point.

15. The system of claim 11, wherein the control circuitry is further configured to:
receive criteria for unauthorized access based on user profile data.

16. The system of claim 11, wherein the second device is at a location remote from the first device, and wherein the communication enables the second device to prevent further access to the first device.

17. The system of claim 11, wherein the control circuitry, when determining a duration of time tracked by the timer has been outputted for longer than the time length of the criteria, is configured to measure an amount of time at a faster rate when the content is of a first type and measuring the amount of time at a slower rate when the content is of a second type.

18. The system of claim 11, wherein the control circuitry is further configured to adjust the time length criteria based on at least one of a number of other user devices within proximity of the first device and an attribute of another device within the proximity of the first device.

19. The system of claim 11, wherein the criteria for unauthorized access corresponds to a content rating.

20. The system of claim 11, wherein the first portion of the content item, the second portion of the content item, and the third portion of the content item are different scenes of the content item.

* * * * *